United States Patent
Rastrow et al.

(10) Patent No.: US 9,600,764 B1
(45) Date of Patent: Mar. 21, 2017

(54) MARKOV-BASED SEQUENCE TAGGING USING NEURAL NETWORKS

(71) Applicant: Amazon Technologies, Inc., Reno, NV (US)

(72) Inventors: Ariya Rastrow, Seattle, WA (US); Spyros Matsoukas, Hopkinton, MA (US); Sri Venkata Surya Siva Rama Krishna Garimella, Seattle, WA (US); Nikko Ström, Kirkland, WA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 462 days.

(21) Appl. No.: 14/307,412

(22) Filed: Jun. 17, 2014

(51) Int. Cl.
*G06F 15/18* (2006.01)
*G06N 3/08* (2006.01)

(52) U.S. Cl.
CPC ..................... *G06N 3/08* (2013.01)

(58) Field of Classification Search
None
See application file for complete search history.

(56) References Cited

U.S. PATENT DOCUMENTS

| | | | | |
|---|---|---|---|---|
| 9,378,735 | B1* | 6/2016 | Garimella | G10L 15/16 |
| 2008/0147588 | A1* | 6/2008 | Leffingwell | G06F 17/30864 706/48 |
| 2010/0145902 | A1* | 6/2010 | Boyan | G06F 17/3089 706/54 |
| 2015/0066496 | A1* | 3/2015 | Deoras | G10L 15/16 704/232 |
| 2015/0170020 | A1* | 6/2015 | Garimella | G06N 3/082 706/14 |

* cited by examiner

*Primary Examiner* — Paulinho E Smith
(74) *Attorney, Agent, or Firm* — Knobbe, Martens, Olson & Bear, LLP

(57) ABSTRACT

Features are disclosed for using a neural network to tag sequential input without using an internal representation of the neural network generated when scoring previous positions in the sequence. A predicted or determined label (e.g., the highest scoring or otherwise most probable label) for input at a given position in the sequence can be used when scoring input corresponding to the next position the sequence. Additional features are disclosed for training a neural network for use in tagging sequential input without using an internal representation of the neural network generated when scoring previous positions the sequence.

23 Claims, 6 Drawing Sheets

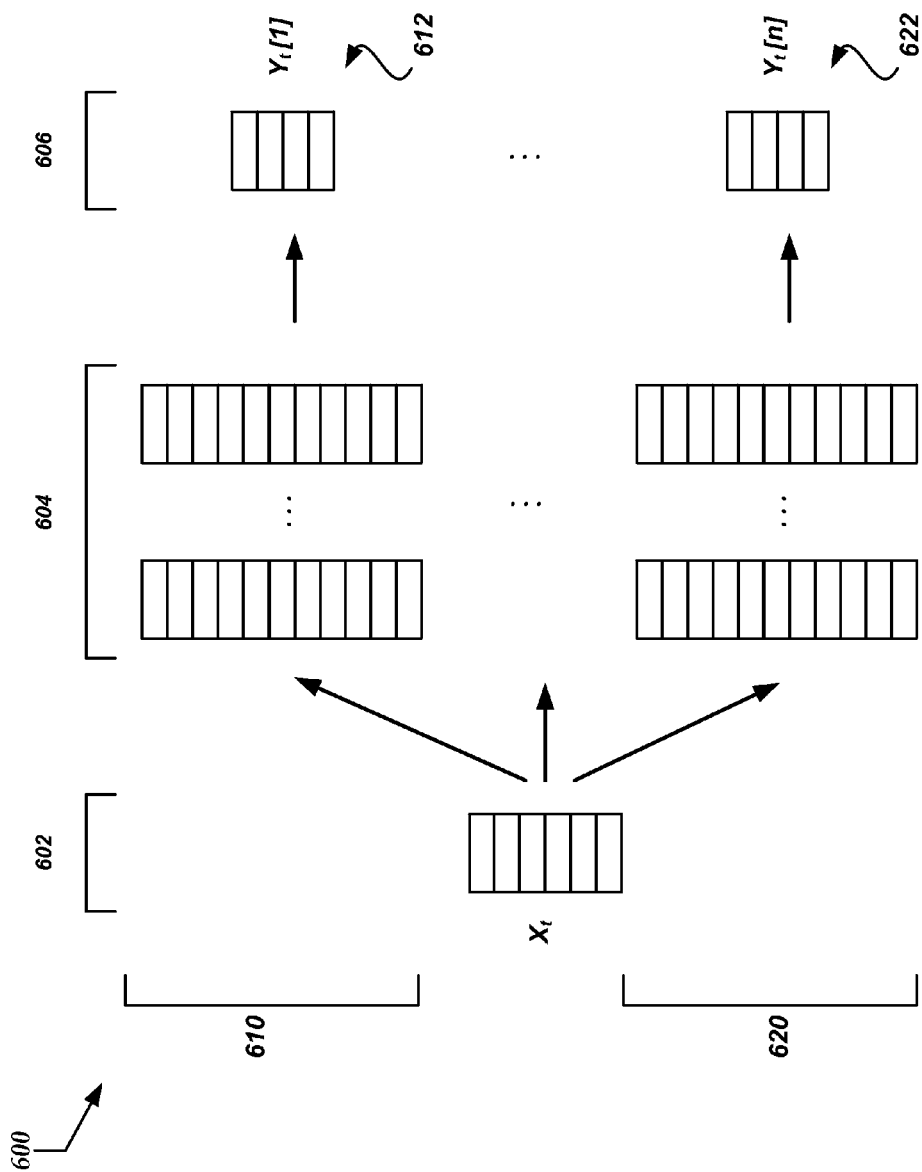

MARKOV-BASED SEQUENCE TAGGING USING NEURAL NETWORKS

BACKGROUND

Computing devices can be used to process a user's spoken commands, requests, and other utterances into written transcriptions. Models representing data relationships and patterns, such as functions, algorithms, systems, and the like, may accept audio data input (sometimes referred to as an input vector), and produce output (sometimes referred to as an output vector) that corresponds to the input in some way. In some implementations, a model is used to generate a probability or set of probabilities that the input corresponds to a particular language unit (e.g., phoneme, phoneme portion, triphone, word, n-gram, part of speech, etc.). For example, an automatic speech recognition ("ASR") system may utilize various models to recognize speech, such as an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance.

ASR systems commonly utilize Gaussian mixture models/hidden Markov models ("GMMs/HMMs") to tag language units in sequences of natural language input. However, artificial neural networks may also be used. Scores in neural-network-based ASR systems are obtained by multiplying trained weight matrices, representing the parameters of the model, with vectors corresponding to feature vectors or intermediate representations within the neural network. This process is referred to as a forward pass. The output can be used to determine which language unit most likely corresponds to the input feature vector. Due to the sequential nature of spoken language, the correct output for a feature vector for a particular frame of audio data may depend upon the output generated for a feature vector for the sequentially previous frame of audio data. Some systems incorporate sequential aspects of language by using recurrent neural networks ("RNNs"). RNNs can produce output based in part on sequentially previous frame by accepting, as input, an internal representation of the RNN for the sequentially previous frame in addition to a feature vector for the current frame.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 6 is a block diagram of another embodiment of a neural network configured for use in Markov-based decoding.

DETAILED DESCRIPTION

Introduction

Figure 1:
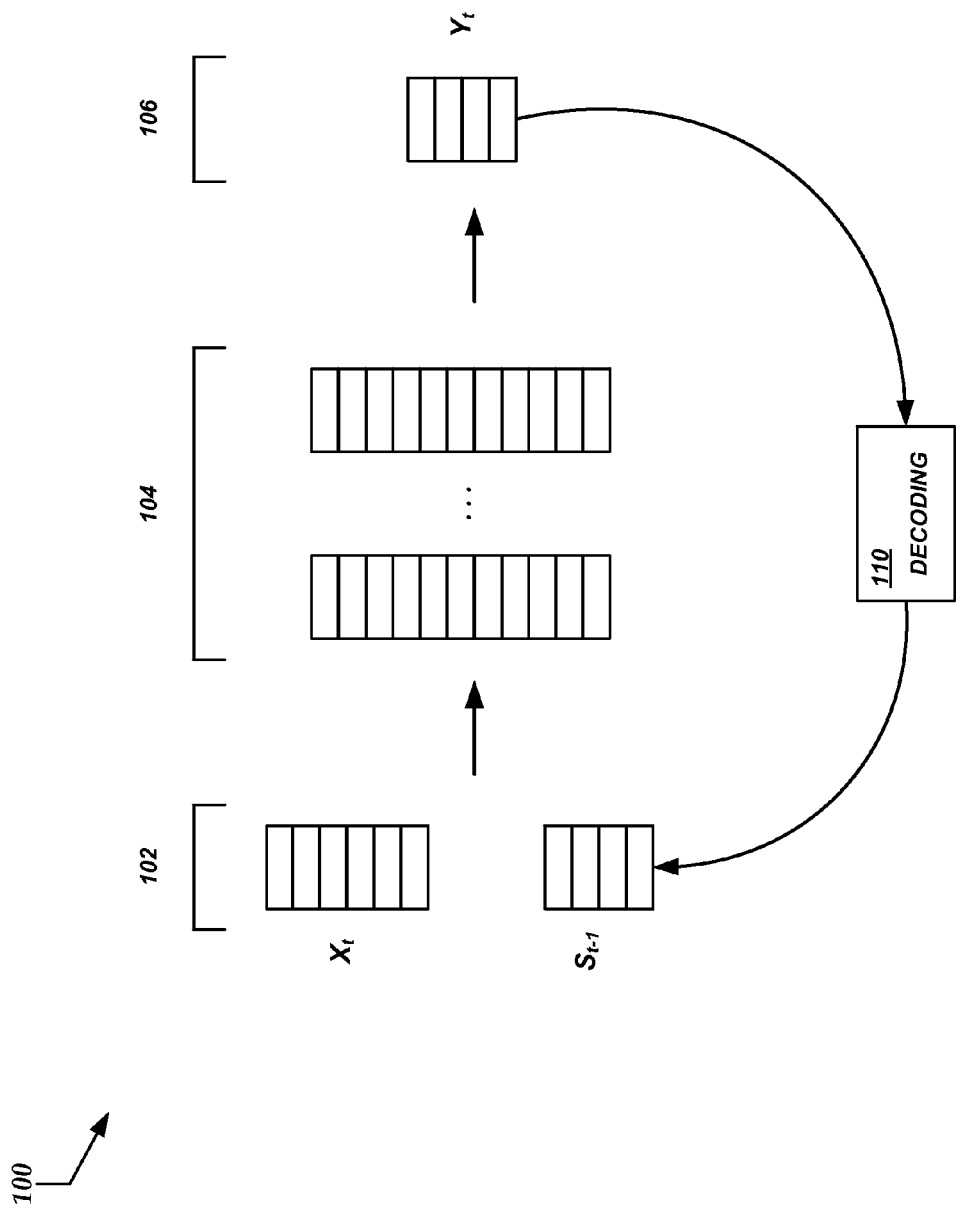
FIG. 1 is a block diagram of an illustrative neural network configured to use input derived from output produced for sequentially previous frames of input data.

The present disclosure is directed to sequence tagging with artificial neural networks using a Markov-model-based approach. Generally described, sequence tagging is often used in natural language processing, where input data corresponds to sequences of language units (e.g., phonemes, n-phones, words, n-grams, sentences, etc.). Each position or "token" of the sequence is "tagged" with a "label" corresponding to a specific language unit (e.g., a specific phoneme, word, part of speech, etc.). Although a classification approach may be used to tag individual tokens with corresponding labels, classification systems do not take into account the temporal and sequential dependencies inherent in natural language. Rather, classification systems typically tag individual tokens independently of other tokens in an input signal.

Some conventional systems use artificial neural networks as structured predictors to decode or tag sequences of tokens while taking into account the sequential nature of the input data. An artificial neural network, also referred to simply as a neural network, is a network containing at least one computational unit, known as a neuron or node, interconnected to other computational units. Conceptually, the nodes may be thought of as calculating output values as a function of a plurality of different input values. Typically, neural networks have multiple (e.g., two or more) layers of nodes, and nodes of adjacent layers may be connected to each other. A neural network may contain several layers, including an input layer, an output layer, and any number of intermediate or "hidden" internal layers. In speech recognition, the input layer may consist of a set of parameters (e.g., a feature vector) for a given time instance, such as a frame of audio data. A distribution of probabilities over all possible labels for the frame may be obtained by doing a forward pass. The forward pass involves multiplying large matrices representing the connection weights between nodes of adjacent layers by vectors corresponding to one or more feature vectors (from the input layer) or hidden representations (from the subsequent hidden layers).

One type of neural network used in structured prediction is a recurrent neural network ("RNN"). An RNN is a specific type of neural network that preserves an internal state (e.g., a hidden layer) of the neural network for use in tagging subsequent tokens in a sequence. The internal state preserved from processing input data for one position in the sequence can be input back into the RNN to process input data for a subsequent position in the sequence, thereby providing sequential information earlier in the sequence being decoded/tagged. For example, when an RNN is used to decode audio input in an automatic speech recognition ("ASR") system, the preserved internal state is based on all previous positions in the sequence, rather than some finite number of previous positions, and can therefore capture long (potentially infinite) dependencies within natural language input. However, the training of RNNs can be more complex and less scalable than other forms of non-recurrent neural networks because the internal representations generated during processing of prior positions in a sequence must be provided during training. Accordingly, training of RNNs typically requires processing training data in the proper sequence so that the internal representations can be generated and preserved for use in processing input for subsequent positions. In addition, using intermediate representations of inputs for prior positions may not completely or adequately capture the predicted label for the prior position in the sequence.

Some aspects of the present disclosure relate to using a neural network to tag sequential input without using an internal representation of the neural network generated when scoring previous positions in the sequence. Instead, a predicted or determined label (e.g., the highest scoring or otherwise most probable label) for input at a finite, predetermined number of previous positions in the sequence can be used when scoring input corresponding to a subsequent position in the sequence (e.g., the label for only the immediately preceding position in the sequence can be used when scoring input for any particular position in the sequence). Accordingly, the neural network does not need to be an RNN, but may instead by any neural network that is configured to operate on a feature vector corresponding to a position in a sequence plus additional data regarding a predicted or determined label for the previous position in the sequence. In this way, the neural network may be used in a Markov-model-based decoding process because the neural network obeys the Markov assumption (the probability distribution of future states depends only on the present state and not on the sequence of events that precede the present state). For example, a deep neural network ("DNN") may be trained to calculate, for an input feature vector corresponding to a particular time instance or frame of audio data, a local probability distribution for all possible labels using the predicted label for the previous time instance or frame of audio data in an input signal. In contrast, an RNN would calculate a probability distribution using an intermediate representation of the RNN from the previous time instance or frame of audio data from the input signal. The intermediate representation of the RNN may be based on any number of previous time instances because no conversion to a single predicted label has occurred. Accordingly, the RNN would not obey the Markov assumption.

Additional aspects of the present disclosure relate to using a neural network obeying the Markov assumption in a Viterbi decoding process. Generally described, a Viterbi decoding process involves calculating, for each position in a sequence, a separate local distribution of probabilities for all possible labels based on any or all possible labels for the previous position in the sequence. Repeated calculations of such local distributions for each position in the sequence can be used to generate a graph of results (e.g., a lattice or trellis), where the connections between states at different positions of the sequence each correspond to a probability that a specific label at one position follows a specific label at the immediately preceding position. The highest-scoring path (or n-best scoring paths) through the graph can be selected and provided to downstream processes and consumers. Viterbi decoding processes are commonly used in hidden Markov model ("HMM") based natural language processing.

Further aspects of the present disclosure relate to training neural networks for use in sequence tagging without requiring each individual training data input (e.g., each feature vector corresponding to an individual sequential position) to be processed sequentially. Training of conventional RNNs requires input of not just the training data feature vector for a particular position of the sequence, but also an internal RNN representation from the prior position in the sequence. Accordingly, training data must be generated sequentially to obtain the internal RNN representations for each training data feature vector, or the RNN must be sequentially trained so that the internal RNN representations for previous positions can be determined during training. However, because Markov-based neural networks rely only on the label predicted for the previous position in the sequence, the training data may be generated automatically so long as the correct label for each position in the sequence is known. In addition, training of the neural network may proceed in any order, because each training data feature vector and correct previous label are known ahead of time, and the correct previous label does not need to be generated by processing the sequentially previous training data feature vector. In this way, Markov-based neural networks can be trained on subsets of training data, training data provided in random or non-sequential order, etc.

Still further aspects of the present disclosure relate to various neural network architectures for Markov-based neural networks. In some embodiments, a neural network may be designed to accept, as input, a feature vector for a particular position in a sequence, and data indicating the predicted label for the previous position in the sequence. For example, the data indicating the predicted label for the previous position may be an array with an element for each possible label, where each element is set to 0 except the element corresponding to the predicted previous label, which is set to 1. In other embodiments, a neural network may be designed accept, as input, a feature vector for a particular position in the sequence without any additional data. The neural network can then generate multiple distributions, such as an array including a separate distribution for each possible previous label. In further embodiments, a feature vector for a particular position in the sequence may be input to multiple neural networks, such as a separate neural network for each possible previous label.

Although the examples and embodiments described herein will focus, for the purpose of illustration, on using neural networks to process natural language input in an automatic speech recognition system (e.g., using DNNs as acoustic models or language models) or a natural language understanding system (e.g., using DNNs to perform named entity recognition), one skilled in the art will appreciate that the techniques described herein may be applied to other processes, methods, or systems. For example, the techniques may be used with other types of neural networks, with neural networks used for purposes other than automatic speech recognition or natural language understanding, etc. Various aspects of the disclosure will now be described with regard to certain examples and embodiments, which are intended to illustrate but not limit the disclosure.

Example Neural Network

FIG. 1 depicts an illustrative neural network 100 configured to generate output (e.g., a distribution of label probabilities) for a position in a sequence using input data indicating a label or predicted label for a sequentially previous position in the sequence. The neural network 100 includes an input layer 102, any number of internal hidden layers 104, and an output layer 106.

In one specific, non-limiting example, the input layer may correspond a feature vector 120 extracted from an input signal, such as a frame of audio data, a word from a sentence, or the like. Illustratively, the feature vector 120 may be named $x_t$, where t corresponds to a particular time instance or other position within a sequence of positions. In addition, the input may include previous label data 122 that corresponds to, or is derived from, output generated by the neural network 100 for a feature vector of a previous position in the sequence. For example, the previous label data 122 may be named $s_{t-1}$, where t−1 corresponds to the time instance or other position immediately preceding t in the sequence. The previous prediction data 122 can indicate the label that was predicted for the previous frame, word, etc. The output layer 106 may correspond to a local probability distribution over all possible labels for the current position within the sequence. A forward pass through the neural network 100 may be performed to process the input through the hidden layers 104 to produce the output, which may be named $y_t$. Although the neural network 100 shown in FIG. 1 includes 2 hidden layers, there may be any number of hidden layers 104. In some embodiments, there may be between three and seven hidden layers 104. Each layer of the neural network 100 may consist of any number of nodes. In some embodiments, one or more layers may include tens, hundreds, or thousands of different nodes corresponding to different trainable parameters of the neural network. In many cases, a neural network may have substantially more parameters (e.g., two to ten times more parameters) than a traditional GMM/HMM model, thereby providing a greater degree of sensitivity and control.

In some embodiments, as shown, the previous label data 122 may be generated as part of a decoding process 110. For example, an ASR or NLU system may be decoding a sequence of words. The system may have used the neural network 100 to generate a probability distribution $y_{t-1}$ for a feature vector corresponding to a position at time t−1 within an input signal. The system may then proceed to use the neural network 100 to generate a probability distribution $y_t$ for the feature vector corresponding to the next position at time t within the input signal. Rather than input the previously determined probability distribution $y_{t-1}$ or some internal representation of the neural network at time t−1, as would be done with an RNN, the decoding process 110 may instead use the specific label was assigned to the previous position at t−1. Illustratively, the process 110 may indicate the label by providing previous label data 122 as an array of elements, each element corresponding to a possible label. The element corresponding to the label for the previous position at t−1 may be set to some predetermined value (e.g., 1), while the elements corresponding to the other labels may be set to some default value (e.g., 0). In this way, the neural network 100 may account for the sequential nature of the input data (e.g., the feature vector $x_t$) by determining the probability distribution over all labels for the position at time t based on the label for the previous position at time t−1. In addition, because the previous label data 122 indicates the previous label without indicating how the previous label was determined and without indicating any earlier labels (e.g., labels at time t−2 or earlier), the neural network 100 obeys the Markov assumption and can be used as a Markov model in Markov-model-based sequence tagging.

Figure 2:
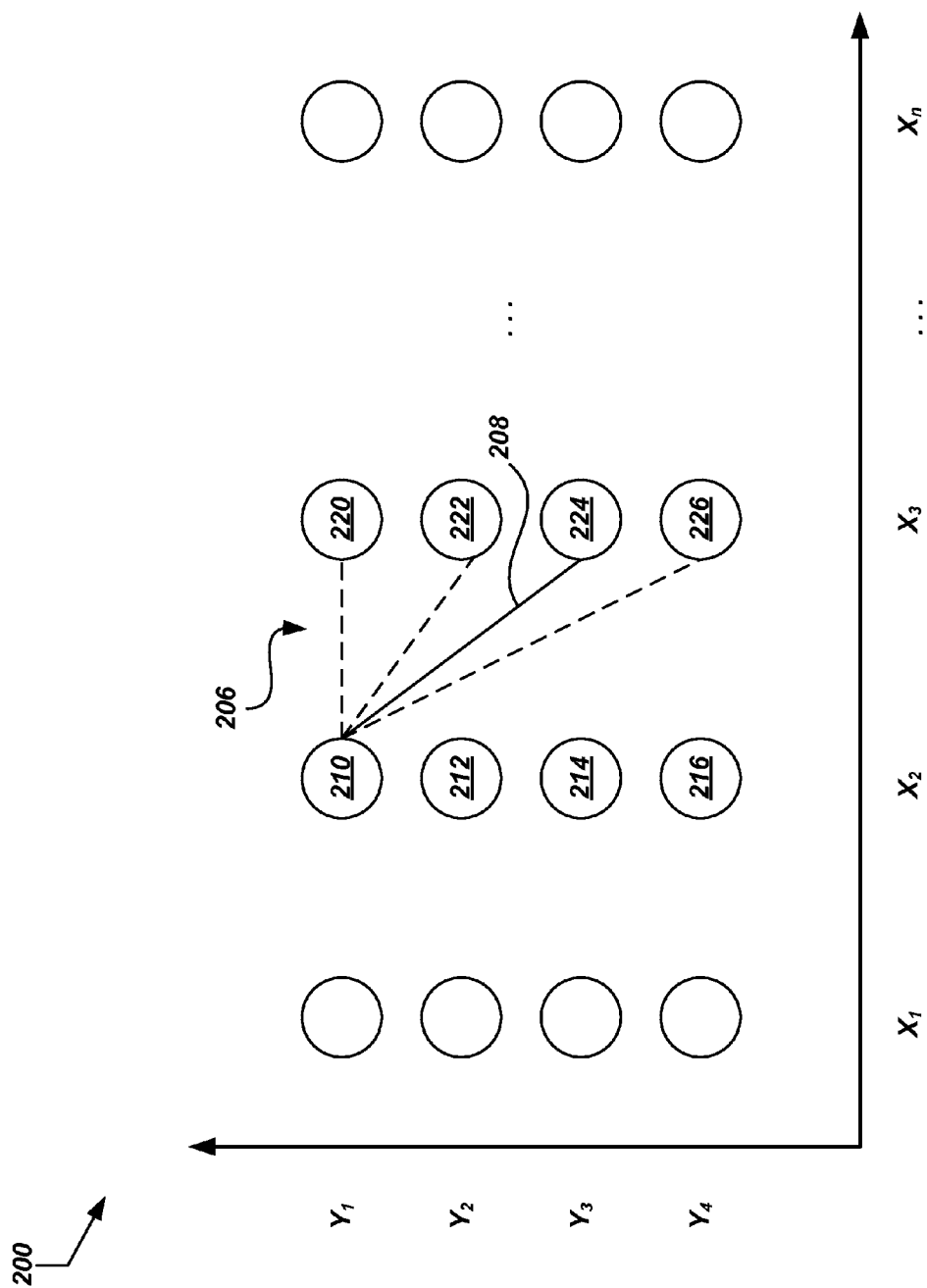
FIG. 2 is a decoding diagram illustrating the use of a neural network in Markov-based decoding.

FIG. 2 is a decoding diagram 200 illustrating the use of a neural network in Markov-model-based sequence tagging, also referred to herein as decoding. The horizontal axis 202 of the decoding diagram 200 corresponds to the sequential positions $x_1, x_2, x_3 \ldots x_n$ of an input signal over time from left (earlier) to right (later). The vertical axis 204 of the decoding diagram 200 corresponds to the possible labels $y_1$, $y_2$, $y_3$, and $y_4$ that may be assigned to each positions in the sequence. Each of the nodes in the decoding diagram 200 corresponds to a particular state in Markov-model-based decoding. For example, state 210 corresponds to position $x_2$ in the sequence when the previous position $x_1$ has been labeled $y_1$. Each connection between two different states corresponds to a probability that the later state followed the earlier state. For example, connection 208 between states 210 and 224 corresponds to the probability that, at position $x_3$, the previous position $x_2$ has been labeled $y_3$.

In one illustrative example, a Markov-model-based decoding process may determine the part of speech for words at the positions in the sequence represented on the horizontal axis. The sequence of words may be "Expensive bait works better than cheap bait." In this example, the word at position $x_2$ is "bait," which can be either a noun or a verb depending upon the context. In particular, if the word at the immediately preceding position $x_1$ is an adjective (e.g., label $y_1$), then it may be highly probably that "bait" is being used as a noun (e.g., "Expensive bait works better . . . ") and should be labeled as such (e.g., label $y_3$). However, if the word at the immediately preceding position $x_1$ is an adverb (e.g., label $y_2$), then it may be highly probably that "bait" is being used as a verb (e.g., "Quickly bait the hook . . . ") and should be labeled as such (e.g., label $y_4$).

The decoding process can include calculating a local distribution of probabilities over all possible labels for $x_2$ when the previous word at $x_1$ has been labeled an adjective (e.g., the word "expensive" has been labeled $y_1$). The decoding process can use a neural network, such as the neural network 100 in FIG. 1 where the current position t=2. The input $x_t$ may include the word at $x_2$, "bait." The input $s_{t-1}$ may indicate that the previous label at $x_1$ was an adjective (label $y_1$). The neural network 100 may then generate the local distribution $y_t$ for t=2. In the decoding diagram 200, the local distribution is represented as a set of connections 206 between state 210 at position $x_2$ and each state 220, 222, 224 and 226 at position $x_3$. State 210 corresponds to label $y_1$ (e.g., that the word at the previous position $x_1$ in the sequence—"expensive"—is an adjective). The connections 206 to states 220, 222, 224 and 226 correspond to the probabilities that the word at position $x_2$ ("bait") is an adjective, adverb, noun, or verb, respectively, based on the immediately preceding word at position $x_1$ being an adjective (label $y_1$). Because "expensive" is indeed an adjective in this example, the connection 208 to state 224 may have the highest probability or score, indicating that the word "bait" should be labeled as a noun; the connections to each other state 220, 222 and 226 may have a relatively low probability or score.

The decoding process can include calculating a local distribution of probabilities over all possible labels for $x_2$ for each remaining possible previous label for $x_1$. For example, the decoding process can use the neural network 100 to generate a second local distribution $y_t$ for t=2 using the input from $x_2$ and also previous label data 102 indicating that the label for $x_1$ was $y_2$. In this example, the local distribution can be represented as a set of connections from state 212 to each of states 220, 222, 224 and 226. As described in greater detail below, the process can be repeated for each remaining possible label $y_3$ and $y_4$ for $x_1$, or from some subset thereof.

Process for Sequence Tagging Using Neural-Network-Based Markov Models

Figure 3:
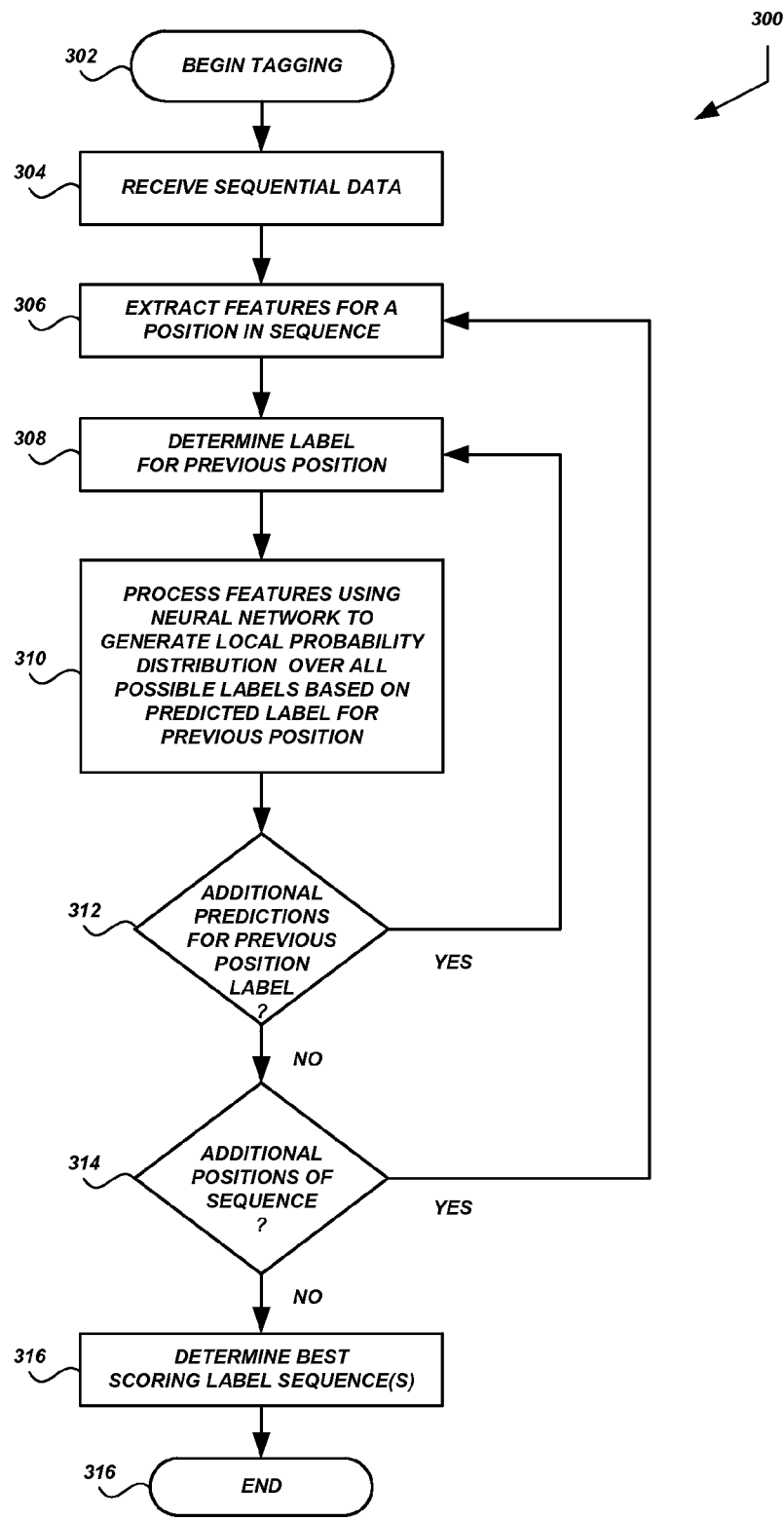
FIG. 3 is a flow diagram of an illustrative process for using a neural network in Markov-based decoding.

FIG. 3 depicts an illustrative process 300 for sequence tagging using neural-network-based Markov models. A computing device may execute the process 300 to tag sequences of data, such as natural language units (e.g., phonemes, n-phones, words, n-grams, sentences, etc.) in an input signal (e.g., audio data, text, etc.). Advantageously, the process 300 includes processing sequential input data using a neural network trained to produce, for individual positions in the sequence, local probability distributions over a set of possible labels based at least partly on a label or predicted label for the previous position in the sequence.

The process 300 begins at block 302. The process 300 may be implemented by a physical computing system, which may include one or more physical computing devices. The computing devices may implement one or more modules or components that perform the process 300, such as hardware components or a combination of hardware and software components. Individual computing devices may include one or more hardware processors operative to communicate with a computer-readable memory, perform computer-executable instructions, receive and manipulate data, and produce output. The output may be provided for display on a video display, stored in a computer-readable storage medium, transmitted to another computing device over a communication network, or the like.

In one specific, non-limiting example, the process 300 may be embodied in a set of executable program instructions stored on one or more non-transitory computer-readable media, such as one or more disk drives or solid-state memory devices, of a physical computing system. When the process 300 is initiated, the executable program instructions can be loaded into memory, such as RAM, and executed by one or more hardware processors of the physical computing system. In some embodiments, the computing system may include multiple (e.g., two or more) computing devices, such as servers, and the process 300 or portions thereof may be executed by multiple servers, serially or in parallel.

At block 304, the computing system executing the process 300 can receive sequential data to be tagged. In the example described above, the sequential data is a sentence including multiple words. The example above is illustrative only, and is not intended to be limiting. The neural-network-based Markov models and corresponding processing described herein may be used on any sequential input data, such as audio data of a user utterance, phoneme sequences produced by an ASR system, etc.

At block 306, the computing system executing the process 300 can begin processing the input data by extracting features for a position in the sequence. In the example described above, a feature vector may be generated for the second position in the sequence, and may include the word "bait" (the first position in the sequence, corresponding to the word "expensive," may have been processed in a previous iteration). Other features may be included in the feature vector (e.g., the previous word, the next word, etc.). The particular features and feature vectors described herein are illustrative only; many other types of features and feature vectors may be used.

At block 308, the computing system executing the process 300 can determine which label corresponds to the previous position. In the example above, the previous position corresponds to the word "expensive," and the predicted label was "adjective." The label may be determined by examining the neural network output generated for the previous position. If the output includes a probability distribution over all possible labels, then the highest scoring label may be selected. In some embodiments, as shown in FIG. 1, an additional feature may be provided as input for the current position. The additional feature $s_{t-1}$ may be an array with elements corresponding to each possible label. The element for the most probable label for the previous position (e.g., "adjective" in this example) can be set to some indicative value (e.g., 1), and the elements for the remainder of the labels can be set to some other value (e.g., 0).

At block 310, the computing system executing the process 300 can process the features for the current position in the sequence by using neural network to generate local probability distribution over all possible labels. The neural network takes into account the label for the previous position, provided as described above or in some other manner.

At block 312, the computing system executing the process 300 can determine whether there are additional predictions for the label corresponding to the previous position. If so, the process 300 can return to block 308 to generate a local distribution for the current position based on additional label prediction(s) for the previous position. In some embodiments, the process 300 can return to block 308 for each possible label that may be assigned to the previous position, regardless of the probability or score determined for the label when processing the previous position. For example, a decoding process may determine probabilities for each possible combination of labels for the sequence. The top-scoring path(s) can then be selected using, e.g., a Viterbi process. In some embodiments, the process 300 can return to block 308 for only a subset of possible labels (e.g., one or more, but fewer than all). For example, the top n-scoring labels may be selected, where n is some number or ratio. As another example, each label with a score exceeding some predetermined or dynamically determined threshold may be chosen, the process 300 can return to block 308 for each of those labels.

In some embodiments, the process 300 may not return to block 308 for other possible prior labels. Rather, blocks 308 and 310 may be executed in parallel (or some other asynchronous manner) for each possible prior label, or some subset thereof. For example, the neural networks illustrated in FIGS. 5 and 6 may be used to generate local probability distributions for multiple possible prior labels in parallel, thereby reducing the total processing time and improving performance.

At block 314, the computing system executing the process 300 can determine whether there are additional positions in the sequence to be processed. If so, the process 300 can return to block 306 for each remaining position.

At block 316, the best scoring sequence or sequences of labels may be chosen. As described above, a Viterbi process may be used to select the best scoring sequence or n-best sequences. In some embodiments, other methods may be used to selected the best scoring label sequence(s).

Process for Training Neural-Network-Based Markov Models

Figure 4:
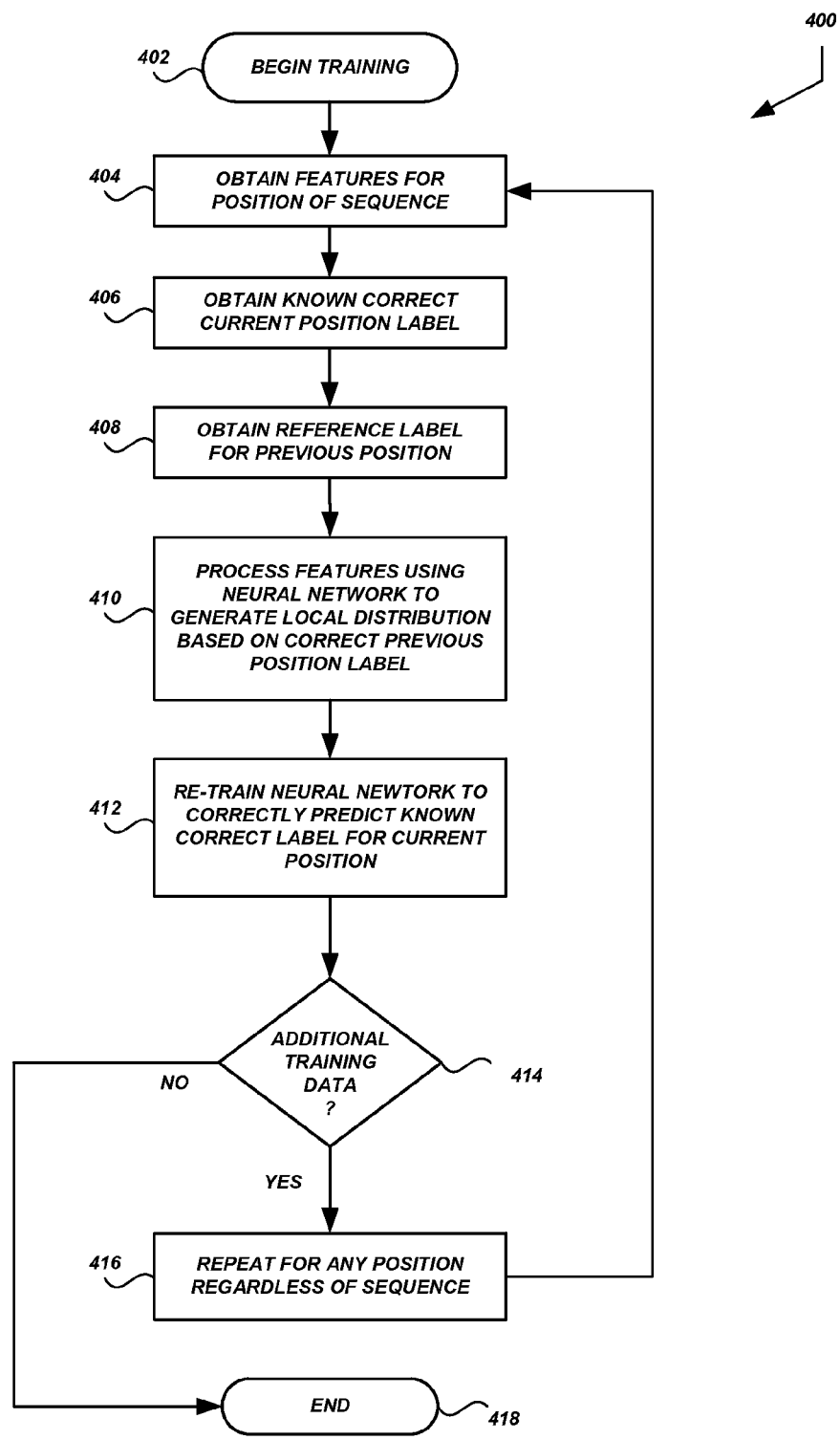
FIG. 4 is a flow diagram of an illustrative process for training a neural network for use in Markov-based decoding.

FIG. 4 depicts an illustrative process 400 for training a neural network for use in Markov-based decoding. Advantageously, the process 400 includes the generation of training data that may be used to train the neural network without requiring training to proceed in a predetermined sequence. Instead, each training data input vector (or other form of input data) may include features for a particular position in a sequence and also the correct label for the preceding position in the sequence. Accordingly, training data for a later position in a sequence may be used to train the neural network prior to (or in the absence of) training data for the immediately preceding position in the sequence.

The process 400 begins at block 402. The process 400 may be implemented by a physical computing system, which may include one or more physical computing devices. The computing devices may implement one or more modules or components that perform the process 400, such as hardware components or a combination of hardware and software components. In one specific, non-limiting example, the process 400 may be embodied in a set of executable program instructions stored on one or more non-transitory computer-readable media, such as one or more disk drives or solid-state memory devices, of a physical computing system. When the process 400 is initiated, the executable program instructions can be loaded into memory, such as RAM, and executed by one or more hardware processors of the physical computing system. In some embodiments, the computing system may include multiple (e.g., two or more) computing devices, such as servers, and the process 400 or portions thereof may be executed by multiple servers, serially or in parallel.

At block 404, the computing system executing the process 400 can obtain features for a particular position within a sequence. For example, the process 400 may be used to train a neural network using the example sentence described above. In this example, the computing system may obtain features for the second position, corresponding to the word "bait."

At block 406, the computing system executing the process 400 can obtain the known correct label for the current position. In the example above, the label is "noun."

At block 408, the computing system executing the process 400 can obtain a reference label for the position immediately preceding the current position, such as the known correct label for the previous position. In the example, above, the label is "adjective." By using the known correct label for the previous position, the neural network can be trained to generate correct results for the current position without basing the results on an erroneous label for the prior previous position. In some embodiments, the computing system executing the process 400 may obtain a label for the previous position that is not known to be correct. Instead, a prediction for the previous label in the sequence may be generated (e.g., by using the neural network to generate the prediction based on training data for the previous position in the sequence). This predicted label may not be verified as being the known correct or "gold-standard" label, but may nevertheless be used during training for the current position. For example, the computing system executing the process 400 may process training data in one or more iterations using the known correct previous labels for each position in the sequence. The computing system may use back propagation to adjust the parameters of the neural network to produce the known correct results for the current position. After one or more iterations of this process, the computing system may then generate reference labels for prior positions in the training data (e.g., using the neural network to score those prior positions). The unverified or noisy data may then be used to train the subsequent positions in the sequence, and the neural network may continue to be trained in this manner as desired. In this way, any bias associated with always using the known correct prior label can be minimized or reduced.

At block 410, the computing system executing the process 400 can process the features for the current position in the sequence to generate a local probability distribution based, at least in part, on the correct label for the previous position in the sequence.

At block 412, the computing system executing the process 400 can train the neural network to correctly predict the known correct label for the current position. In some embodiments, the neural network may be trained to correctly predict the known correct label for the current position using a technique known as back propagation. In back propagation, parameters of the neural network (e.g., the matrices by which layers of the neural network are multiplied during a forward pass) are adjusted so that the neural network better discriminates between incorrect and correct labels.

At decision block 414, the computing system executing the process 400 can determine whether there is additional training data to process. If not, the process 400 can end at block 418. If there is additional training data, the process 400 can proceed to block 416, where the computing system may repeat the training process for any additional training data input without being required to process the training data input in a predetermined sequence, which would not be possible using an RNN. For example, the process can be repeated for any previous or subsequent position in the current sequence in any order, for any position in any other sequence, etc. Individual training data inputs may be selected according to some predetermined or dynamically determined schedule, or they may be randomly selected.

Additional Embodiments

Figure 5:
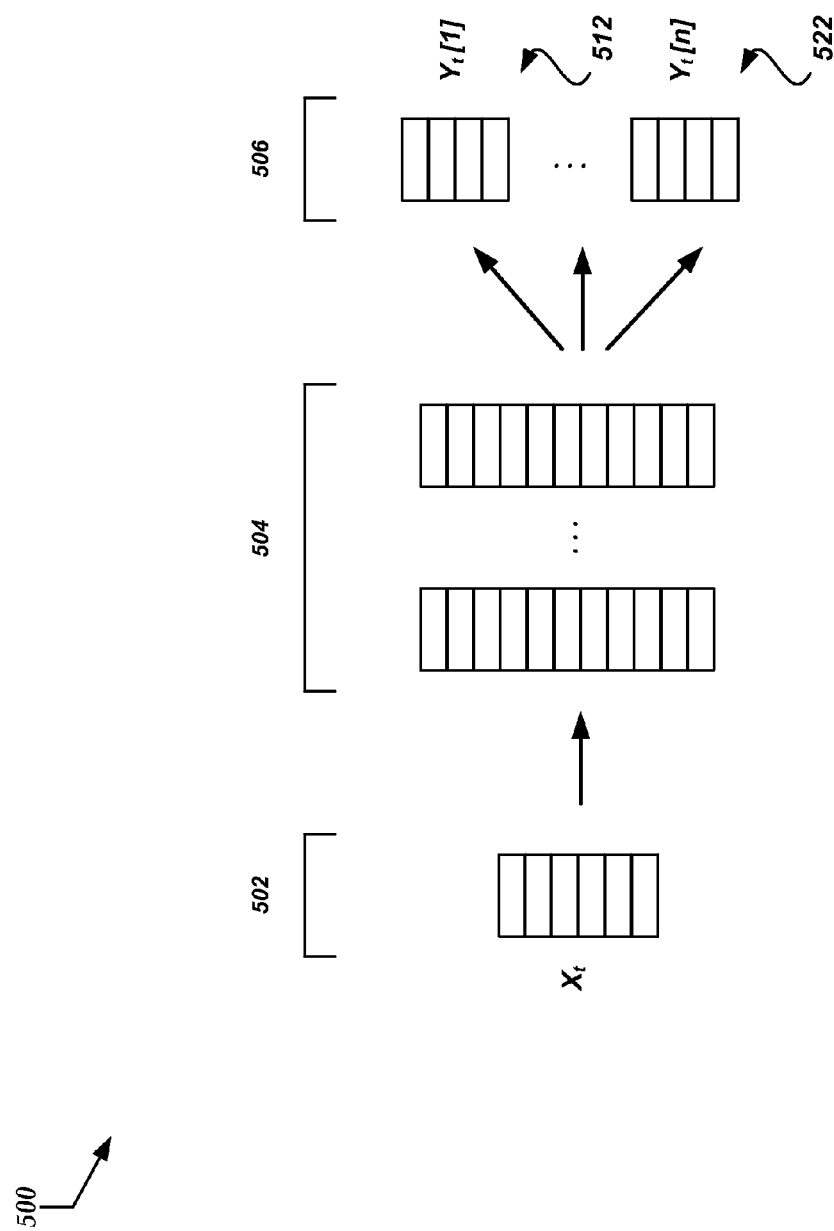
FIG. 5 is a block diagram of another embodiment of a neural network configured for use in Markov-based decoding.

FIG. 5 depicts another embodiment of a neural network 500 hat may be used in Markov-based sequence tagging. The neural network 500 includes an input layer 502, any number of internal hidden layers 504, and an output layer 506. However, the neural network 500 is different than the neural network 100 described above because the neural network 500 in FIG. 5 does not necessarily accept previous label data as input. Instead, the neural network 500 can accept an input feature vector for a particular position in a sequence and generate a separate local probability distribution for each possible label that may be applied to the previous position in the sequence. For example, the neural network 500 may take an input feature vector $x_t$, and produce an array of local probability distributions, such as $y_t[1]$ 512 to $y_t[n]$ 522 (or $y_t[0]$ to $y_t[n-1]$, etc.), where n corresponds to the number of possible labels for position $x_{t-1}$ of the sequence.

FIG. 6 depicts another embodiment of a neural network 600 that may be used in Markov-based sequence tagging. Conceptually, the neural network 600 may be thought of as multiple (e.g., two or more) different neural networks, and the feature vector $x_t$ may be input into each network separately. The neural network 600 shown in FIG. 6 includes networks 610-620 corresponding to each possible label for a previous position in the sequence. Each of the individual neural networks may be trained to produce probability distributions for a given position based on a different label corresponding to the previous position in the sequence. For example, neural network 610 may accept an input feature vector $x_t$ 602, and process the feature vector though any number of internal hidden layers 604 to produce an output distribution 606. The particular output distribution $y_t[1]$ 612 may be based on an assumption regarding the label for the previous position in the sequence (e.g., "adjective"). A different neural network 620 may produce an output distribution $y_t[n]$ 622 based on an assumption that the label for the previous position in the sequence was a different label (e.g., "adverb"). During training of the neural network 600, only the particular neural network 610-620 that corresponds to the correct output may be modified using back propagation. In some embodiments, additional networks 610-620 may be modified accordingly.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
   obtain input data regarding a sequence of tokens, the sequence of tokens comprising a first token and a second token, wherein the first token immediately precedes the second token in the sequence of tokens;

generate, using a neural network and data regarding the first token, a first probability distribution reflecting, for each label of a plurality of labels, a probability that the label corresponds to the first token;

generate, using the first probability distribution, preceding label data indicating that a particular label of the plurality of labels corresponds to the first token;

generate, using the neural network and the preceding label data and information regarding the second token, a second probability distribution reflecting, for each label of the plurality of labels, a probability that the label corresponds to the second token, wherein the second probability distribution is generated by the neural network independently of any label corresponding to any token in the sequence of tokens preceding the first token; and determine a sequence of labels corresponding to the sequence of tokens based at least partly on the first and second probability distributions.

2. The system of claim 1, wherein one or more processors are programmed to at least use the neural network as a Markov model.

3. The system of claim 1, wherein the preceding label data comprises a plurality of values, each value of the plurality of values corresponding to a different label of the plurality of labels, and wherein the value corresponding to the particular label is larger than all other values of the plurality of values.

4. A computer-implemented method comprising:
under control of one or more computing devices configured with specific computer-executable instructions,
obtaining input data regarding a current position in a sequence comprising a plurality of positions;
obtaining preceding label data regarding a label for each of a finite number of preceding positions in the sequence;
generating, using a neural network, a probability distribution reflecting, for each label of a plurality of labels, a probability that the label corresponds to the current position, wherein the probability distribution is based at least partly on the input data and the preceding label data; and
determining a sequence of labels corresponding to the sequence of the plurality of positions based at least partly on the probability distribution.

5. The computer-implemented method of claim 4, wherein the finite number of preceding positions is limited to fewer than a total number of preceding positions in the sequence.

6. The computer-implemented method of claim 4, wherein the finite number of preceding positions corresponds to only the position immediately preceding the current position.

7. The computer-implemented method of claim 4, wherein the neural network is not a recurrent neural network.

8. The computer-implemented method of claim 4, wherein the input data regarding the current position comprises a feature vector extracted from an input signal.

9. The computer-implemented method of claim 4, wherein the preceding label data comprises a plurality of values, each value of the plurality of values corresponding to a different label of the plurality of labels.

10. The computer-implemented method of claim 4, further comprising training the neural network using the input data regarding the current position and correct label data regarding the correct label for each of the finite number of preceding positions.

11. The computer-implemented method of claim 10, further comprising training the neural network using non-sequential training data.

12. The computer-implemented method of claim 11, wherein training the neural network using non-sequential training data comprises using input data for the current position prior to using input data for a preceding position.

13. The computer-implemented method of claim 4, wherein the sequence of labels corresponding to the sequence of the plurality of positions is determined using a Viterbi process.

14. One or more non-transitory computer readable media comprising executable code that, when executed, cause one or more computing devices to perform a process comprising:
obtaining input data regarding a current position in a sequence comprising a plurality of positions;
generating, using a neural network, a probability distribution reflecting, for each label of a plurality of labels, a probability that the label corresponds to the current position, wherein the probability distribution is based at least partly on the input data and a label prediction for each of a finite number of preceding positions in the sequence; and
determining a sequence of labels corresponding to the sequence of the plurality of positions based at least partly on the probability distribution.

15. The one or more non-transitory computer readable media of claim 14, wherein the probability distribution is generated independently of a label prediction for any position of the sequence occurring before the finite number of preceding positions.

16. The one or more non-transitory computer readable media of claim 14, wherein the finite number of preceding positions is limited to fewer than a total number of preceding positions in the sequence.

17. The one or more non-transitory computer readable media of claim 14, wherein the neural network is not a recurrent neural network.

18. The one or more non-transitory computer readable media of claim 14, wherein the input data regarding the current position comprises a feature vector extracted from an input signal.

19. The one or more non-transitory computer readable media of claim 14, wherein the preceding label data comprises a plurality of values, each value of the plurality of values corresponding to a different label of the plurality of labels.

20. The one or more non-transitory computer readable media of claim 14, the process further comprising training the neural network using the input data regarding the current position and correct label data regarding the correct label for the preceding position.

21. The one or more non-transitory computer readable media of claim 14, the process further comprising training the neural network using input data for the current position prior to using input data for the preceding position.

22. The one or more non-transitory computer readable media of claim 14, wherein the neural network generates, for a single input of the input data, a plurality of probability distributions, wherein individual probability distributions of the plurality of probability distributions correspond to different label predictions for the preceding position in the sequence.

23. The one or more non-transitory computer readable media of claim 14, the process further comprising generating, using a second neural network, a second probability distribution reflecting, for each label of the plurality of labels, a probability that the label corresponds to the current position, wherein the second probability distribution is based at least partly on the input data and a second label prediction for the preceding position in the sequence, and wherein the second label prediction is different than the label prediction.

* * * * *